United States Patent [19]

Kiang

[11] E Patent Number: Re. 32,752

[45] Reissued Date of Patent: Sep. 20, 1988

[54] PROTECTIVE COVERING DEVICE FOR LONG BARRELED FIREARMS

[76] Inventor: Raymond Kiang, 7th Floor, 10, Alley 33, Lane 216, Sec. 4, Chung-Hsiao E. Road, Taipei, Taiwan

[21] Appl. No.: 92,453

[22] Filed: Sep. 3, 1987

Related U.S. Patent Documents

Reissue of:

[64] Patent No.: 4,644,987
Issued: Feb. 24, 1987
Appl. No.: 807,158
Filed: Dec. 10, 1985

[51] Int. Cl.[4] ..... F41C 27/00; B65D 65/08

[52] U.S. Cl. ..... 150/52 R; 206/317; 224/911; 224/913; 42/74; 42/96; 428/919

[58] Field of Search ..... 150/52 R; 206/315.11, 206/317; 224/911, 913; 428/250, 919; 42/1.01-1.15, 74, 96

[56] References Cited

U.S. PATENT DOCUMENTS

| | | | |
|---|---|---|---|
| 1,924,598 | 8/1933 | Eustis | 428/250 X |
| 2,115,368 | 4/1938 | Lustberg | 428/250 X |
| 2,135,901 | 11/1938 | Lea | 428/250 X |
| 2,885,812 | 5/1959 | Arpin | 224/913 X |
| 2,901,018 | 8/1959 | Kolpin | 150/52 R |
| 3,081,923 | 3/1963 | Bagby | 224/913 X |
| 3,540,508 | 11/1970 | Couch | 150/52 R |
| 3,574,965 | 4/1971 | Seiger | 150/52 R X |
| 3,665,990 | 5/1972 | Hefner | 150/52 R |
| 3,701,371 | 10/1972 | Stackhouse | 150/52 R |
| 4,485,947 | 12/1984 | Cook | 224/911 |

FOREIGN PATENT DOCUMENTS

| | | | |
|---|---|---|---|
| 208970 | 7/1940 | Switzerland | 224/913 |

*Primary Examiner*—William Price
*Assistant Examiner*—Sue A. Weaver
*Attorney, Agent, or Firm*—Dike, Bronstein, Roberts, Cushman & Pfund

[57] ABSTRACT

A protective covering device for [rifles] *long barreled firearms* includes an integral fiber cloth sheet elastic nature shaped to fit the wooden portion of a rifle; each opposite longitudinal edge of the fiber sheet being applied with adhesive agent and sewn together to constitute a covering body with a single waterproof seam formed thereat; a fastening device longitudinally provided in an opening located in the middle of one side of the covering body; and a butt piece of soft material closely connected with the lower end of the covering body, so that the structure of the protective covering device provides effective protection for the wooden portions of [a rifle] *said firearm.*

6 Claims, 2 Drawing Sheets

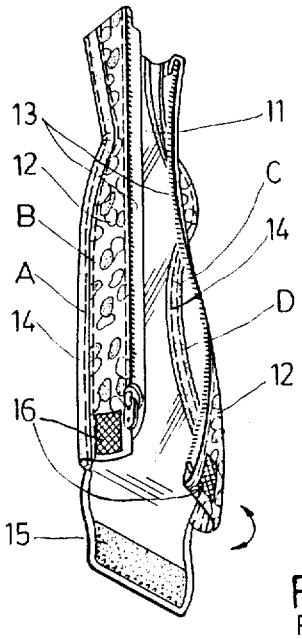
F I G. 1
PRIOR ART
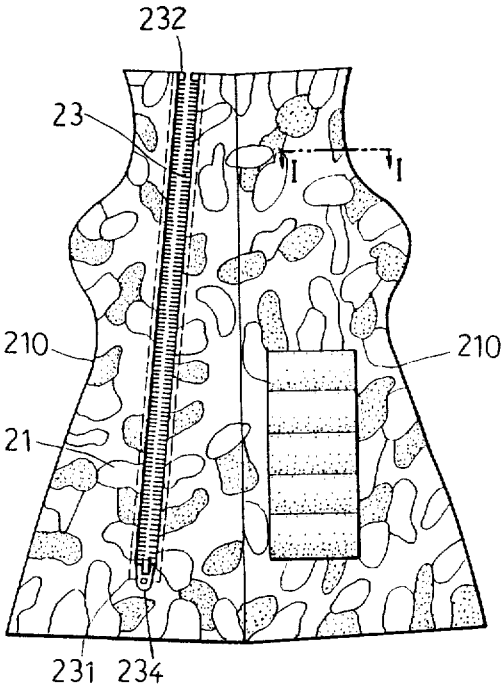
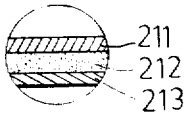
F I G. 2A
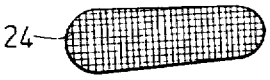
F I G. 2B
F I G. 2

PROTECTIVE COVERING DEVICE FOR LONG BARRELED FIREARMS

Matter enclosed in heavy brackets [ ] appears in the original patent but forms no part of this reissue specification; matter printed in italics indicates the additions made by reissue.

This invention relates to a protective device for rifles, and more particularly to that type of a protective covering device of which an integral member is shaped to fit over the wooden portion of a rifle and provided with closing means so as to promote its utility and protective capability.

It is generally understood that in addition to technical improvement in armament development, maintenance work plays an important role in protecting arms against the elements. It is to satisfy this need that a protective cover for rifle stock has been produced. The purposes of the protective cover are as follows:

(1) As the luster of the wooden stock seldom fades in a rifle, light reflection may reveal the location of the rifle. This is particularly true in the woods, so that variegated protective covers are adopted to obtain a camouflage effect.

(2) When the rifle stock becomes wet in the rain, the wood portion of the stock will expand, and on being exposed in the sun, the wood portion will contract. Under these circumstances, it is difficult to maintain the rifle stock in good condition.

The known protective cover for rifle stock is as shown in FIG. 1 wherein the protective cover is made of a number of pieces of plastic sheeting, including an elongated side piece 11 and two short side pieces 12. The outer edges of the elongated side piece 11 and the short side pieces 12 are stitched together through an elastic band 14 so as to provide the tubular cover with elasticity, and a zipper 13 is provided for closing the open sides of the two short side pieces 12. In addition, the elongated side piece 11 has an extension at its tail portion with a hook tape 15 arranged on the inner side thereof, and each tail end of the short side pieces 12 is provided with a loop tape 16 for being joined with the hook tape 15. In practical use, the tubular portion of the cover is wrapped around the rifle stock and closed up by the zipper 13 with the extension of the elongated side piece 11 folded over the butt portion of the rifle stock through the hook and loop tapes 15 and 16. However, problems suffered by the known protective cover are as follows:

(1) In order to provide the protective cover with elasticity, elastic bands have to be furnished. As a result, not only is preparation of the cloth and elastic bands difficult, but also seams formed in the cover such as that of A, B, C and D shown in FIG. 1 are easily susceptible to rain water seeping in.

(2) Since the known protective cover is made of plastic waterproof cloth, the surface of the protective cover is slippery and hard to grip firmly during the rain.

(3) As the butt portion of the rifle stock cannot be completely enclosed by the tail extension of the cover as shown in FIG. 1, rain water or foreign matter can easily penetrate into the cover.

SUMMARY OF THE INVENTION

It is accordingly a primary object of this invention to provide a protective covering device for the wooden portions of a rifle to ameliorate the problems associated with the prior art.

This and other objects are achieved by providing a protective covering device for the wooden portions of a rifle according to this invention, which device comprises: an integral fiber cloth sheet of elastic nature designed to fit the shape of a rifle stock; the opposite longitudinal edges of the fiber cloth sheet being applied with adhesive agent and sewed together to constitute a covering body with a single seam formed thereat; a zipper longitudinally provided in an opening located in the middle of one side of the covering body; and a butt piece of soft material such as rubber closely connected with the lower end of the cover body; so that the structure of the protective covering device according to this invention provides effective protection for the rifle stock. In addition, a single fiber cloth sheet is also prepared according to the shape of the handguard portion of the rifle and its opposite edges are adhesively sewed together so as to form a separate handguard protective covering body therewith.

Other objects and advantages of this invention will become apparent from the following detailed description which, taken in connection with the annexed drawings, discloses a preferred embodiment of this invention as defined in the appending claims.

BRIEF DESCRIPTION OF THE DRAWINGS

FIG. 1 is a perspective view of a known protective cover for rifle stocks;

FIG. 2 is an illustrative view of a preferred embodiment of a protective covering device for rifle stocks according to this invention;

FIG. 2A is a plan view of a butt piece prepared according to the covering body of the preferred embodiment of FIG. 2;

FIG. 2B is cross-sectional view of a fiber cloth sheet taken from the line I—I of the preferred embodiment shown in FIG. 2;

DETAILED DESCRIPTION OF THE PREFERRED EMBODIMENT

Figure 3:
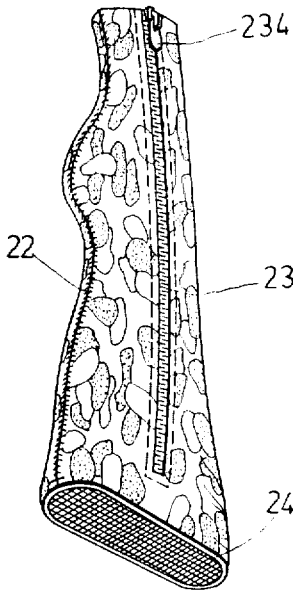
FIG. 3 is a three-dimensional view of the preferred embodiment shown in FIG. 2.
Figure 4:
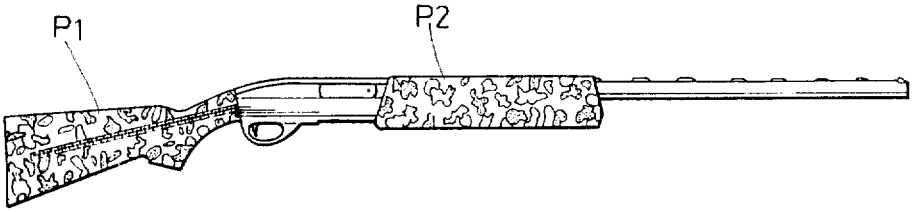
FIG. 4 is an elevational view of the preferred embodiment used on a rifle.

Referring to FIGS. 2 and 3, the preferred embodiment of a protective covering device for rifles according to this invention comprises: an integral fiber cloth sheet 21 cut in accordance with the shape of a rifle stock with both longitudinal edges 210 applied with adhesive agent and sewed together for providing a covering body P1 with an opening defined respectively at its upper and lower ends, and a single waterproof seam 22 formed at its side as shown in FIG. 3; a zipper 23 longitudinally provided at a central area of one side of the covering body P1 with its bottom end 231 terminating at a suitable distance away from the lower end of the covering body P1 and its top end piece 232 located at the upper edge thereof, so that when the zipper 23 is closed, the zipper slide is positioned at the upper end with its pull tab 234 anchored thereat as shown in FIG. 3; and a butt piece 24 (as shown in FIG. 2B), made of soft rubber of a proper thickness and prepared in line with the butt plate of the rifle, adhesively connected to the circumferential edge of the opening at the lower end of the covering body P1, completing the preferred embodiment of the protective covering device for rifle stocks as shown in FIG. 3.

Referring to FIG. 2B, the fiber cloth sheet 21 used for the preferred embodiment includes a variegated outer fiber layer 211, an inner fiber layer 213 and an intermediate rubber layer 212 integrally formed therebetween for providing elasticity as well as impermeability to water for the fiber cloth sheet 21.

Figure 5:
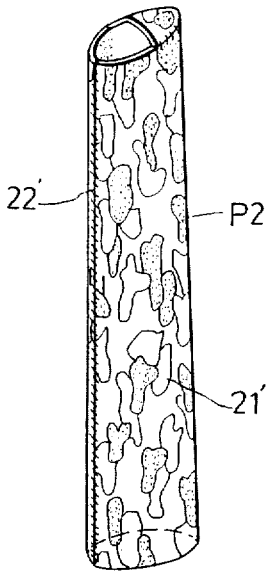
FIG. 5 is a three-dimensional view of a protective covering body for the handguard of the rifle according to this invention.

Referring to FIG. 5, a protective covering body P2 for the handguard of the rifle is also made available with the same fiber cloth material as that for the protective covering body P1 for the rifle stock as shown in FIG. 3. The method of joining the opposing edges of the fiber cloth sheet 21' and the condition of the seam 22' are also the same as those described and illustrated above for the stock protective covering body P1.

This invention resides in the fiber cloth sheet which is elastic by nature and requires no additional elastic bands to be stitched to it, in contrast to the prior art.

This invention resides also in the configuration of the protective covering device, which is made of an integral fiber cloth sheet with a single seam well processed to ensure its waterproof efficiency.

This invention resides more specifically in the structure of the butt portion which is made of soft rubber material of a suitable thickness, which reduces the recoil impact of the rifle upon the shoulder blade of the user during firing operation as well as provides a buffer effect at the stock heel when the rifle is used in drilling. Moreover, the joint of the butt portion is closely sealed to the edges of the lower end of the covering body to achieve a desirable waterproof effect.

Certain modifications and improvements will occur to those skilled in the art upon reading the foregoing. It should be understood that all such modifications and improvements have been deleted herein for the sake of concisiveness and readibility but fall properly within the scope of the following claims.

What I claim is:

1. A protective covering device for [rifles] *a long barreled firearm* comprising:

a fiber cloth sheet [integrally formed with a variegated outer fiber layer, an intermediate rubber layer and a inner fiber layer for providing elasticity and impermeability to water, said fiber cloth sheet being] designed in accordance with the shape of a wooden portion of [a rifle] *said firearm*, and having its opposite longitudinal edges applied with adhesive agent and sewn together so as to form a covering body with an opening respectively defined at both its upper and lower ends and a single waterproof seam formed at one of its sides of the covering body, for being wrapped around the wooden portion of the [rifle] stock *of said firearm;* a closing means longitudinally disposed in [a middle area of] one side of said covering body [with its bottom piece located at a distance away from a lower end of said fiber cloth sheet and its top piece positioned at an upper edge of said fiber cloth sheet] for [effecting] opening and closing [therewith] *said covering body*; and a butt piece, shaped in line with a butt plate of [the rifle] *said firearm*, adhesively connected to a circumferential edge of the opening at the lower end of said covering body for providing a buffer effect; whereby, effective protection for the wooden portion of [a rifle] *said firearm* against rainwater and impact stress in operation is achieved accordingly.

2. A protective covering device [for rifles] according to claim 1 wherein said closing means is a zipper.

3. A protective covering device [for rifles] according to claim 1 wherein said butt piece is a soft rubber formed in a proper thickness so as to effect protection against water infiltration, recoil impact on the user's shoulder blade during firing and shock action in training.

*4. A protective covering device according to claim 1 wherein said fiber cloth sheet is integrally formed with an outer fiber layer and an inner rubber layer.*

*5. A protective covering device according to claim 1 wherein said fiber cloth sheet is integrally formed with an outer fiber layer, an intermediate rubber layer and an inner fiber layer for providing elasticity and impermeability to water.*

*6. A protective covering device according to claim 5 wherein said outer fiber layer is variegated to provide a protective coloration.*

* * * * *